July 2, 1935.                F. G. BLOCH                2,006,434
                          ELECTRIC FIRE ALARM
                          Filed Oct. 27, 1933
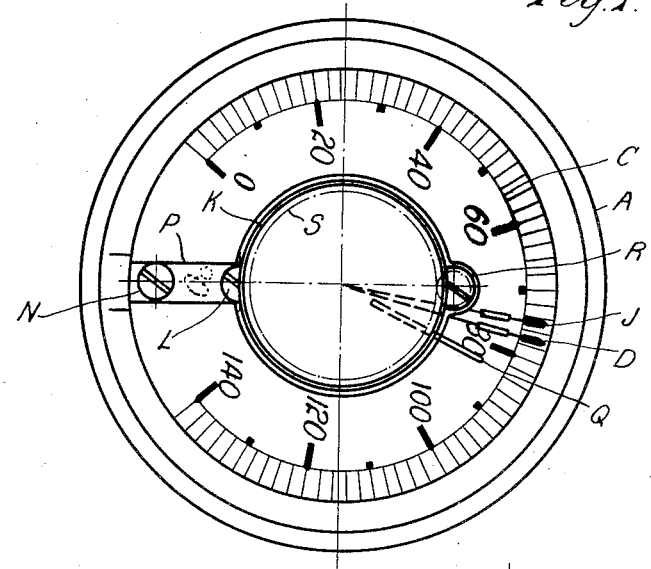
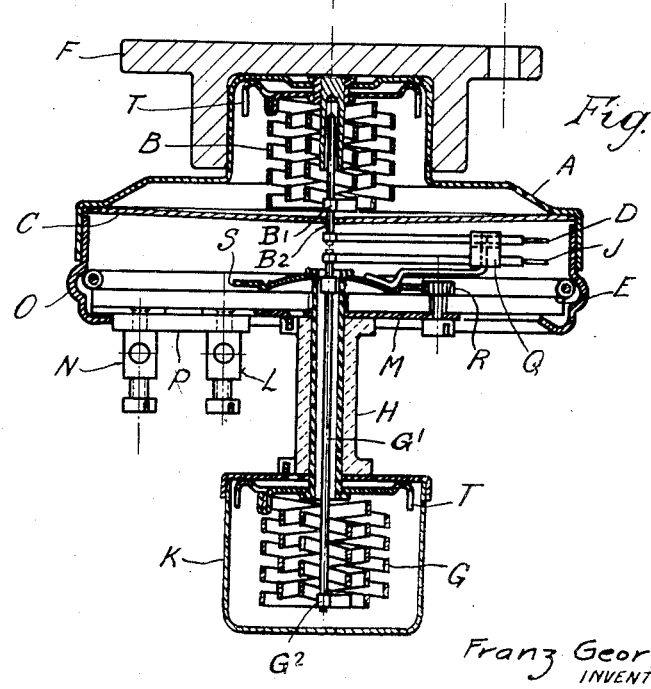
Franz Georg Bloch
INVENTOR
By Otto Munk
his Atty.

Patented July 2, 1935

2,006,434

UNITED STATES PATENT OFFICE 2,006,434

ELECTRIC FIRE ALARM

Franz Georg Bloch, Leitmeritz, Czechoslovakia

Application October 27, 1933, Serial No. 695,447
In Germany July 21, 1933

9 Claims. (Cl. 200—138)

This invention relates to a device for operating electric fire alarms and provides a device which is operative not only on sudden increases in temperature but also when a predetermined maximum temperature has been reached.

The operating device of the present invention is of the kind comprising two co-acting indicating thermometers of different reactional velocity having pointers coaxially disposed and moving in substantially parallel planes over a common scale, said pointers being provided with electric contacts and the pointer of the more rapidly reacting system being located in the rear of the pointer of the more slowly reacting system in the direction of movement of said pointers.

According to the invention, in a device of the foregoing kind, the indicating pointers are connected by floating spindles to temperature-sensitive bi-metallic helices actuating the same.

In the preferred embodiment of the invention the temperature-sensitive actuating system for each indicating pointer comprises a plurality of strip helices of different diameters coaxially disposed one within the other and so combined that the rotational angles described by the individual helices under the influence of temperature changes are additive. Such temperature-sensitive actuating systems have been described in my prior specification No. 378,314.

The two co-acting indicating thermometers are preferably mounted in a completely closed casing having a glass front through which the temperature indications are visible.

The designing of the one thermometer to have a lower reactional velocity to heat than the other thermometer can be accomplished by making the heat absorption capacity of the system, casing or mount fittings of the one thermometer greater than that of the other.

The two thermometers are assembled in such a manner that both pointers, which are provided with contacts and electrically conductive connections, move substantially in the same plane and the axes of the pointers coincide. The pointer of the more sluggish thermometer is preferably set to the normal temperature marked on the scale whilst the pointer of the second instrument is set to a somewhat lower temperature.

The device is mounted, like the known devices, near the ceiling of the room to be protected. So long as the temperature varies in normal manner, i. e. gradually, both pointers move with approximate equality of phase and, under these conditions, the device remains inoperative. If, on the other hand, the temperature rises suddenly, the pointer of the more rapidly reacting instrument describes a quicker angular movement than the other pointer, until it comes into contact with the latter, when the electric circuit is completed and the alarm is set in operation.

Owing to the circumstance that the distance between the two pointers can be varied at any time, the sensitiveness of the device can be adjusted to suit the conditions of each case. In the case of a gradualy smouldering fire which does not radiate heat, the device responds when the pointers encounter the limit pointer, set to a definite maximum temperature. The device can also be employed with advantage for indicating a sudden fall in temperature. For this application, the pointer of the more rapidly reacting system is set ahead of the other, so that, in the event of a considerable fall in temperature, it encounters said other pointer and thus closes the contacts.

The invention can also be employed for physical or technical experiments, such as for ascertaining the rate of propagation of heat.

In order more clearly to understand the invention, reference is made to the accompanying drawing which illustrates by way of example one embodiment thereof and in which:—

Fig. 1 is a plan; and

Fig. 2 is a cross section.

A denotes a casing housing the members of the two indicating thermometers having pointers D and J respectively. The first indicating thermometer comprises a temperature-sensitive member B in the form of a plurality of strip helices of different diameters coaxially disposed one within the other and so combined that the rotational angles described by the individual helices under the influence of temperature changes are additive. Floatingly connected to the end $B^1$ of the innermost helix of the temperature-sensitive member B is a spindle $B^2$ on which is mounted the indicating pointer D which is provided with a contact member.

The second indicating thermometer comprises a temperature-sensitive member G of similar construction to the temperature-sensitive member B and a spindle $G^1$ floatingly secured to the end $G^2$ of the innermost helix, said spindle $G^1$ carrying the pointer J likewise provided with a contact member.

The spindle $G^1$ of the second thermometer is mounted in a heat insulating tube H and the temperature-sensitive member G is covered by a thin cap K to protect it from dirt.

The closed casing A has a glass plate E through which the temperature indications are visible.

The pointer J is in electrical connection with a terminal L through member M. A second terminal N is electrically connected with the cover O of the casing, and thus with the casing A or the pointer D, the insulating bridge P affording a firm support to the two terminals. Q denotes a limit pointer, which is externally adjustable in a very simple manner, by a small pinion R and engaging with a resilient toothed disc S. Each temperature-sensitive member of both thermometers is provided with a known flexible zero-point adjustment T.

The alarm functions in the following manner:—

The pointer D indicates the temperature prevailing in the room, whilst the pointer J is set to a somewhat lower temperature. The difference between the two pointers can be varied at any time by the zero-point adjustment, depending on the degree of sensitiveness desired. The limit pointer Q is set to the maximum permissible temperature. The alarm is mounted as close as possible to the ceiling of the room that is to be protected, care being taken not to mount it in the immediate vicinity of sources of strong heat, such as heating pipes or the like. The thermometer with the temperature-sensitive member B has a lower reactional velocity than the thermometer with the temperature-sensitive member G. In the case of bi-metallic thermometers, the reactional velocity can be easily determined, either by imparting a greater heat capacity to the temperature-sensitive member itself, by making it of stouter material, or by providing the casing, baseplate and so forth, with greater heat capacity by more or less increasing the weight of these members, or by employing materials of more or less good heat conductive capacity.

In the embodiment shown, the temperature-sensitive member of both thermometers are of the same design, but the heat capacity of the one thermometer is increased by means of the stouter baseplate and the larger, unventilated casing, whilst in the other thermometer the heat capacity is reduced to a minimum. With a view to rendering the temperature-sensitive member G independent of the heat capacity of the glass plate, the insulating tube H is provided.

If this alarm be exposed to the action of a source of heat which produces a considerable rise in temperature within a short time, for example, a flame or the like, the temperature-sensitive member G will react more quickly than the member B, so that the pointer J will come into contact with the pointer D and thus complete an electric circuit, by means of which any convenient warning device can be set in operation. The sensitiveness of the fire alarm can be subsequently modified, according to the local conditions. If, in the case of a gradually smouldering fire, the rise in temperature necessary to bring the two pointers into contact should not occur, the apparatus will nevertheless respond when the temperature attains the maximum limit fixed by Q, since, in such event, the second pointer must come to bear against the first, and contact wil be established.

I claim:—

1. A device for operating electric fire alarms, consisting of two indicating thermometers each comprising a plurality of bi-metallic strip helices of different diameters coaxially disposed one within the other and so combined that the rotational angles described by the individual helices under the influence of temperature changes are additive, an attachment for one free end of said helices and a pointer directly connected to and carried by the other free end of said helices, means imparting to one or said indicating thermometers a different reactional velocity from that of the other, a common scale over which said pointers move, and electric contacts on said pointers.

2. A device for operating electric fire alarms, consisting of two indicating thermometers each comprising a plurality of bi-metallic strip helices of different diameters coaxially disposed one within the other and so combined that the rotational angles described by the individual helices under the influence of temperature changes are additive, an attachment for one free end of said helices and a pointer directly connected to and carried by the other free end of said helices, means imparting to one of said indicating thermometers a different reactional velocity from that of the other, a common scale over which said pointers move, and electric contacts on said pointers, the pointers of said thermometer being located at different angles.

3. A device for operating electric fire alarms, consisting of two indicating thermometers each comprising a plurality of bi-metallic strip helices of different diameters coaxially disposed one within the other and so combined that the rotational angles described by the individual helices under the influence of temperature changes are additive, an attachment for one free end of said helices and a pointer directly connected to and carried by the other free end of said helices, means imparting to one of said indicating thermometers a different reactional velocity from that of the other, a common scale over which said pointers move, electric contacts on said pointers and means for adjusting the relative positions of said pointers.

4. A device for operating electric fire alarms consisting of two indicating thermometers each comprising a plurality of bi-metallic strip helices of different diameters coaxially disposed one within the other and so combined that the rotational angles described by the individual helices under the influence of temperature changes are additive, an attachment for one free end of said helices and a pointer directly connected to and carried by the other free end of said helices, means imparting to one of said indicating thermometers a different reactional velocity from that of the other, a common scale over which said pointers move, an adjustable limit pointer and electric contacts on all of said pointers.

5. A device for operating electric fire alarms comprising a closed casing having a glass front, two indicating thermometers each comprising a temperature sensitive member, in the form of a plurality of bi-metallic strip helices of different diameters coaxially disposed one within the other and so combined that the rotational angles described by the individual helices under the influence of temperature changes are additive, a floating spindle coacting with each temperature-sensitive member and a pointer mounted on said floating spindle, means imparting to one of said indicating thermometers a different reactional velocity from that of the other and a common scale over which said pointers move.

6. A device for operating electric fire alarms comprising a closed casing having a glass front, two indicating thermometers each comprising a temperature sensitive member, in the form of a plurality of bi-metallic strip helices of different diameters coaxially disposed one within the other and so combined that the rotational angles described by the individual helices under the influence of temperature changes are additive, a floating spindle coacting with each temperature-sensitive member and a pointer mounted on said floating spindle, means imparting to one of said indicating thermometers a different reactional velocity from that of the other, a common scale over which said pointers move and electric contacts on said pointers.

7. A device for operating electric fire alarms comprising a closed casing having a glass front, two indicating thermometers each comprising a temperature sensitive member, in the form of a plurality of bi-metallic strip helices of different diameters coaxially disposed one within the other and so combined that the rotational angles described by the individual helices under the influence of temperature changes are additive, a floating spindle coacting with each temperature-sensitive member and a pointer mounted on said floating spindle, means imparting to one of said indicating thermometers a different reactional velocity from that of the other, a common scale over which said pointers move, electric contacts on said pointers and means for adjusting the relative positions of said pointers.

8. A device for operating electric fire alarms comprising a closed casing having a glass front, two indicating thermometers each comprising a temperature sensitive member, in the form of a plurality of bi-metallic strip helices of different diameters coaxially disposed one within the other and so combined that the rotational angles described by the individual helices under the influence of temperature changes are additive, a floating spindle coacting with each temperature-sensitive member and a pointer mounted on said floating spindle, means imparting to one of said indicating thermometers a different reactional velocity from that of the other, an adjustable limit pointer, a common scale over which said pointers move and electric contacts on said pointers.

9. A device for operating electric fire alarms, consisting of two indicating thermometers each comprising a plurality of bi-metallic strip helices of different diameters coaxially disposed one within the other and so combined that the rotational angles described by the individual helices under the influence of temperature changes are additive, an attachment for one free end of said helices and a pointer directly connected to and carried by the other free end of said helices, a separate housing for each plurality of helices, means imparting to one of said indicating thermometers a different reactional velocity from that of the other, a common scale over which said pointers move, and electric contacts on said pointers.

FRANZ GEORG BLOCH.